US012700351B2

(12) United States Patent
Jeon et al.

(10) Patent No.: US 12,700,351 B2
(45) Date of Patent: Aug. 4, 2026

(54) DISPLAY DEVICE

(71) Applicant: Samsung Display Co., Ltd., Yongin-Si (KR)

(72) Inventors: Joo Hee Jeon, Yongin-si (KR); Gun Hee Kim, Yongin-si (KR); Sang Hee Jang, Yongin-si (KR); Sun Young Jung, Yongin-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days.

(21) Appl. No.: 19/078,286

(22) Filed: Mar. 13, 2025

(65) Prior Publication Data

US 2025/0363936 A1 Nov. 27, 2025

(30) Foreign Application Priority Data

May 21, 2024 (KR) ........................ 10-2024-0065973

(51) Int. Cl.
*G09G 3/32* (2016.01)

(52) U.S. Cl.
CPC ....... *G09G 3/32* (2013.01); *G09G 2300/0426* (2013.01); *G09G 2310/0267* (2013.01); *G09G 2330/021* (2013.01)

(58) Field of Classification Search
CPC ... G09G 3/32–3291; G09G 2300/0421; G09G 2300/0426; G09G 2310/0202; G09G 2310/0267; G09G 2310/0281; G09G 2310/06; G09G 2310/08; G09G 2330/021; G09G 2380/02
See application file for complete search history.

(56) References Cited

U.S. PATENT DOCUMENTS

| | | | | |
|---|---|---|---|---|
| 10,714,500 | B2 | 7/2020 | Heo et al. | |
| 11,355,570 | B2 | 6/2022 | Park et al. | |
| 11,367,399 | B2 | 6/2022 | Jung et al. | |
| 11,881,177 | B2 * | 1/2024 | Kobayashi | G09G 3/3426 |
| 2015/0293546 | A1 * | 10/2015 | Tanaka | G02F 1/136286 327/541 |

(Continued)

FOREIGN PATENT DOCUMENTS

| | | | |
|---|---|---|---|
| KR | 10-2020-0021276 | A | 2/2020 |
| KR | 10-2020-0076302 | A | 6/2020 |

(Continued)

OTHER PUBLICATIONS

English translation of KR-20210152085-A (Year: 2021).*

*Primary Examiner* — Nathan Danielsen
(74) *Attorney, Agent, or Firm* — Innovation Counsel LLP

(57) ABSTRACT

A display device includes a display area including a pixel that emits light, and a scan driver that is configured to supply a scan signal to the pixel, and a non-display area surrounding the display area, extending in a first direction, and including a clock line that is configured to supply a clock signal to the scan driver. The scan driver includes a first gate driver configured to supply a first gate signal to the pixel, a second gate driver configured to supply a second gate signal and a third gate signal to the pixel, and a light emitting control driver configured to supply a light emitting signal to the pixel. The clock line is closest to the first gate driver in the scan driver among the first gate driver, the second gate driver, and the light emitting control driver.

18 Claims, 9 Drawing Sheets

(56) References Cited

U.S. PATENT DOCUMENTS

| | | | | |
|---|---|---|---|---|
| 2021/0264857 | A1* | 8/2021 | Wang | G09G 3/3258 |
| 2021/0319756 | A1* | 10/2021 | Kim | G09G 3/3225 |
| 2025/0095536 | A1* | 3/2025 | Zhao | H10D 86/00 |

FOREIGN PATENT DOCUMENTS

| | | | | | |
|---|---|---|---|---|---|
| KR | 10-2260970 | B1 | | 6/2021 | |
| KR | 10-2021-0086316 | A | | 7/2021 | |
| KR | 20210152085 | A | * | 12/2021 | G09G 3/3225 |

* cited by examiner

STG: STG1, STG2, STG3, STG4

STG: STG1, STG2, STG3, STG4

DISPLAY DEVICE

CROSS-REFERENCE TO RELATED APPLICATION

This application claims priority to Korean Patent Application No. 10-2024-0065973 filed on May 21, 2024, and all the benefits accruing therefrom under 35 U.S.C. § 119, the content of which in its entirety is herein incorporated by reference.

BACKGROUND

1. Technical Field

The present disclosure relates to a display device.

2. Description of the Related Art

As an information society develops, the demand for a display device for displaying an image is increasing in various forms. For example, the display device has been applied to various electronic devices such as smartphones, digital cameras, laptop computers, navigation devices, and smart televisions. The display device may include a light emitting element in which each of the pixels of a display panel may emit light by itself, thereby displaying an image without a backlight unit providing the light to the display panel.

The display device includes a plurality of pixels, data lines and gate lines connected to the plurality of pixels, a data driver that supplies a data voltage to the data lines, and a scan driver that supplies a scan signal to the gate lines. The data driver and the scan driver may drive the plurality of pixels according to a predetermined frequency.

SUMMARY

Aspects of the present disclosure provide a display device capable of reducing an area of a non-display area.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an embodiment of the present disclosure, a display device includes a display area including a pixel that emits light, and a scan driver that is configured to supply a scan signal to the pixel, and a non-display area surrounding the display area, extending in a first direction, and including a clock line that is configured to supply a clock signal to the scan driver. The scan driver includes a first gate driver configured to supply a first gate signal to the pixel, a second gate driver configured to supply a second gate signal and a third gate signal to the pixel, and a light emitting control driver configured to supply a light emitting signal to the pixel. The clock line is closest to the first gate driver in the scan driver among the first gate driver, the second gate driver, and the light emitting control driver.

A length of each of the first gate driver, the second gate driver, and the light emitting control driver in a second direction intersecting the first direction may be greater than a length of each of the first gate driver, the second gate driver, and the light emitting control driver in the first direction.

Each of a width of the second gate driver in the first direction and a width of the light emitting control driver in the first direction may be greater than a width of the first gate driver in the first direction.

The display device may further include a connection line extending in a second direction intersecting the first direction and electrically connecting the clock line and the scan driver.

The clock line may include a write clock line configured to supply a clock signal to the first gate driver, a control clock line configured to supply a clock signal to the second gate driver, and a light emitting clock line configured to supply a clock signal to the light emitting control driver.

The write clock line may be closest to the display area among the write clock line, the control clock line, and the light emitting clock line.

The connection line may include a first connection line electrically connecting the write clock line and the first gate driver, a second connection line electrically connecting the control clock line and the second gate driver, and a third connection line electrically connecting the light emitting clock line and the light emitting control driver.

The first gate driver may include a plurality of stages arranged in the first direction. The second connection line may pass between stages adjacent to each other in the first direction.

The second gate driver may include a plurality of stages arranged in the first direction. The third connection line may pass between the stages of the first gate driver adjacent to each other in the first direction and between stages of the second drivers adjacent to each other in the first direction.

The display device may further include a start connection line disposed in the non-display area to supply a start signal, and a start line disposed in the display area and connected to the start connection line to supply the start signal to the scan driver.

The start line may include a first start line configured to supply a first start signal to the first gate driver, a second start line configured to supply a second start signal to the second gate driver, and a third start line configured to supply a third start signal to the light emitting control driver. The start connection line may include a first start connection line configured to supply the first start signal to the first start line, a second start connection line configured to supply the second start signal to the second start line, and a third start connection line configured to supply the third start signal to the third start line.

Each of the first, second, and third start connection lines may include a first portion disposed on a first side of the non-display area including the clock line and extending in the first direction, a second portion connected to the first portion and extending in a second direction intersecting the first direction from a second side adjacent to the first side of the non-display area, and a third portion connected to the second portion and extending to the display area.

The scan driver may include a scan transistor disposed in a first active layer including a first material. The pixel may include a transistor disposed in a second active layer including a second material different from the first material.

The pixel may include a light emitting element, a first transistor supplying a driving current to the light emitting element, a second transistor supplying a data voltage to a first electrode of the first transistor, a third transistor electrically connecting a second electrode of the first transistor and a gate electrode of the first transistor, a fourth transistor configured to supply an initialization voltage to the gate electrode of the first transistor, a fifth transistor configured to supply a driving voltage to the first electrode of the first transistor, and a sixth transistor electrically connecting the second electrode of the first transistor and a first electrode of the light emitting element.

The first gate driver may be configured to supply the first gate signal to a gate electrode of the second transistor. The second gate driver may be configured to supply the second gate signal to a gate electrode of the third transistor and the third gate signal to a gate electrode of the fourth transistor. The light emitting control driver is configured to supply the light emitting signal to a gate electrode of each of the fifth and sixth transistors.

According to an embodiment of the present disclosure, a display device includes a display area including a pixel that includes a transistor to emit light, and a scan driver that includes a scan transistor to supply a scan signal to the pixel, a non-display area surrounding the display area, extending in a first direction, and including a clock line that supplies a clock signal to the scan driver, a first active layer including a semiconductor area of the scan transistor, a first gate layer disposed on the first active layer and including a gate electrode of the scan transistor, a second gate layer disposed on the first gate layer, a first connection metal layer disposed on the second gate layer and including a gate low voltage line, a second connection metal layer disposed on the first connection metal layer and including a metal layer, a second active layer disposed on the second connection metal layer and including a semiconductor area of the transistor overlapping the metal layer, a third gate layer disposed on the second active layer and including a gate electrode of the transistor, and a first source metal layer disposed on the third gate layer and including the clock line.

The scan transistor and the transistor may overlap in a thickness direction.

The display device may further include a connection line disposed in the first connection metal layer and electrically connecting the clock line and the scan transistor.

The second gate layer may include a scan capacitor electrode that overlaps the gate electrode of the scan transistor to form a scan capacitor of the scan driver. The first connection metal layer may include a first capacitor electrode that overlaps the metal layer to form a first capacitor of the pixel. The first source metal layer may include a second capacitor electrode that overlaps the gate electrode of the transistor to form a second capacitor of the pixel.

The display device may further include a second source metal layer disposed on the first source metal layer and including an anode connection electrode electrically connected to the transistor, and a pixel electrode layer disposed on the second source metal layer and including a pixel electrode connected to the anode connection electrode.

According to one or more embodiments, clock lines are disposed in a non-display area, and a scan driver is disposed in a display area and adjacent to the clock lines, thereby reducing the area of the non-display area and reducing power consumption.

It should be noted that effects of the present disclosure are not limited to those described above and other effects of the present disclosure will be apparent to those skilled in the art from the following descriptions.

BRIEF DESCRIPTION OF THE DRAWINGS

The above and other features of the inventive concept will become more apparent by describing in detail embodiments thereof with reference to the accompanying drawings.

DETAILED DESCRIPTION OF THE EMBODIMENTS

Figure 1:
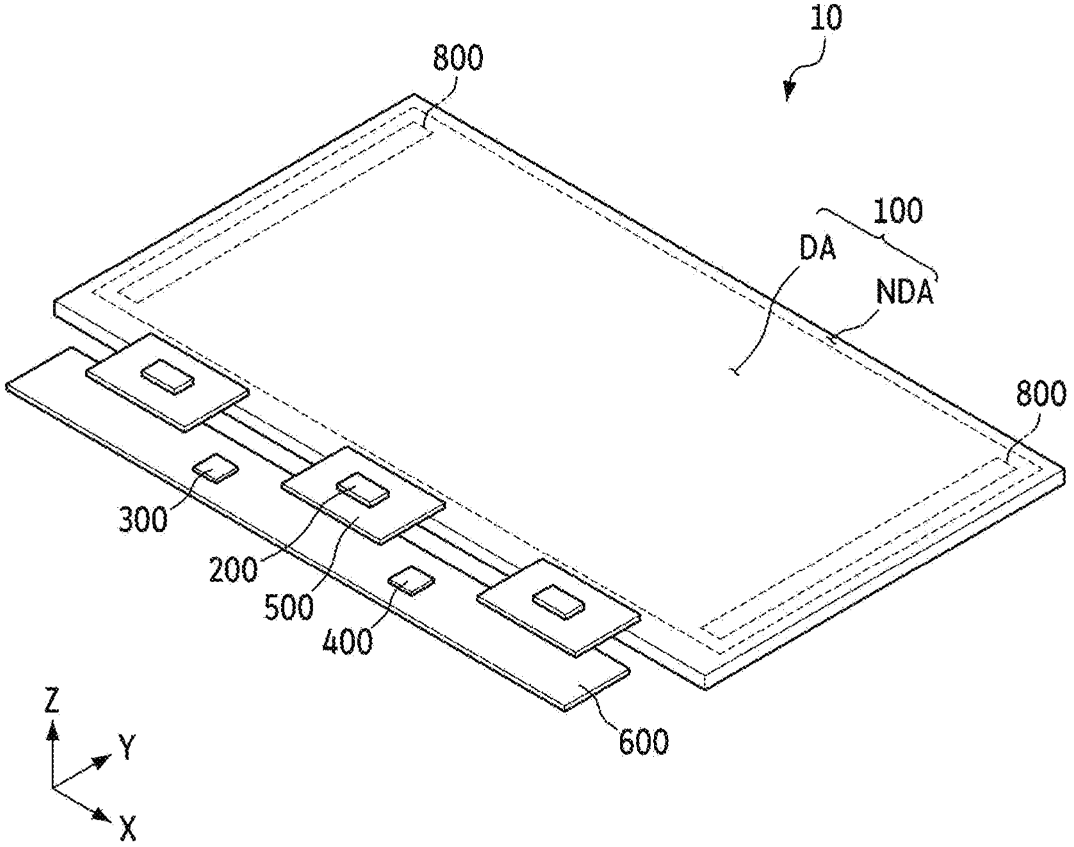
FIG. 1 is a perspective view illustrating a display device according to an embodiment.

Embodiments of the present disclosure address a problem in which any of a plurality of touch lines overlapping data fan-out line or scan fan-out line produce a parasitic capacitance between the touch line and the data fan-out line or between the touch line and the scan fan-out line. Due to the parasitic capacitance, a touch signal of the touch line may be affected by a data voltage of the data fan-out line or a scan control signal of the scan fan-out line, and thus, a touch sensing error may occur.

Embodiments of the present disclosure provide a display device capable of preventing a touch signal of a touch line from being affected by a data voltage of a data fan-out line or a scan control signal of a scan fan-out line.

The present disclosure now will be described more fully hereinafter with reference to the accompanying drawings, in which various embodiments are shown. This present disclosure may, however, be embodied in many different forms, and should not be construed as limited to the embodiments set forth herein. Rather, these embodiments are provided so that this disclosure will be thorough and complete, and will fully convey the scope of the present disclosure to those skilled in the art. Like reference numerals refer to like elements throughout.

It will also be understood that when a layer is referred to as being "on" another layer or substrate, it can be directly on the other layer or substrate, or intervening layers may also be present. In contrast, when an element is referred to as being "directly on" another element, there are no intervening elements present.

It will be understood that, although the terms "first," "second," "third" etc. may be used herein to describe various elements, components, regions, layers or sections, these elements, components, regions, layers or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting.

As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

As used herein, the terms "comprises," "comprising," "includes," and "including" mean the presence of stated features, regions, integers, steps, operations, elements, or components, but do not preclude the presence or addition of one or more other features, regions, integers, steps, operations, elements, components, or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the present disclosure will be described in detail with reference to the accompanying drawings.

FIG. 1 is a perspective view illustrating a display device 10 according to an embodiment.

Referring to FIG. 1, the display device 10 is a device that displays a moving image or a still image, and may be used as a display screen of each of various products such as a television, a laptop computer, a monitor, a billboard, and Internet of Things (IoT) as well as portable electronic devices such as a mobile phone, a smartphone, a tablet personal computer (PC), a smartwatch, a watch phone, a mobile communication terminal, an electronic organizer, an electronic book, a portable multimedia player (PMP), a navigation device, and an ultra mobile PC (UMPC).

The display device 10 may include a display panel 100, a data driver 200, a timing controller 300, a power supply unit 400, a data circuit board 500, a control circuit board 600, and a scan driver 800.

The display panel 100 may have a rectangular planar surface with a long side in an X-axis direction and a short side in a Y-axis direction that intersects the X-axis direction. A corner where the long side in the X-axis direction and the short side in the Y-axis direction meet may be rounded to have a predetermined curvature or may be formed at a right angle. The planar shape of the display panel 100 is not limited to the quadrangular shape, and may be formed in other polygonal shapes, a circular shape, or an elliptical shape. The display panel 100 may be formed to be flat, but is not limited thereto. For example, the display panel 100 may include curved surface portions formed at left and right distal ends thereof and having a constant curvature or a variable curvature. The display panel 100 may be flexibly formed to be curved, bent, folded, or rolled.

The display panel 100 may include a display area DA displaying an image and a non-display area NDA disposed around the display area DA. The display area DA may occupy most of an area of the display panel 100. The display area DA may be disposed at a center of the display panel 100. The display area DA may include a plurality of pixels displaying an image, and the scan driver 800.

Each of the plurality of pixels may include a light emitting element that emits light. The light emitting element may include at least one of an organic light emitting diode including an organic light emitting layer, a quantum dot light emitting diode including a quantum dot light emitting layer, an inorganic light emitting diode including an inorganic semiconductor, and a micro light emitting diode (micro LED), but is not limited thereto.

The scan driver 800 may supply a scan signal to a gate line of the display area DA. The scan driver 800 may be disposed on the left and right edges of the display area DA, but is not limited to this.

The non-display area NDA may be disposed to be adjacent to the display area DA. The non-display area NDA may be an area outside the display area DA. The non-display area NDA may be disposed to surround the display area DA. The non-display area NDA may be an edge area of the display panel 100.

The non-display area NDA may include a fan-out line and a pad portion. The fan-out line may electrically connect the data driver 200 and a data line of the display area DA. The pad portion may be electrically connected to the data circuit board 500. The pad portion may be disposed at a lower edge of the display panel 100, but is not limited thereto.

The data driver 200 may output signals and voltages for driving the display panel 100. The data driver 200 may supply a data voltage to the data line. The data driver 200 may supply a power voltage to a power line and may supply a scan control signal to the scan driver 800. The data driver

200 may be formed as an integrated circuit (IC) and mounted on the data circuit board 500 in a chip on film (COF) method. As another example, the data driver 200 may be mounted in the non-display area NDA of the display panel 100 using a chip on glass (COG) method, a chip on plastic (COP) method, or an ultrasonic bonding method.

The timing controller 300 may be mounted on the control circuit board 600 and may receive digital video data and timing synchronization signals supplied from a display driving system or a graphics device through a user connector provided on the control circuit board 600. The timing controller 300 may align the digital video data to fit a pixel arrangement structure based on the timing synchronization signal, and may supply the aligned digital video data to the data driver 200. The timing controller 300 may generate a data control signal and a scan control signal based on the timing synchronization signal. The timing controller 300 may control a supply timing of the data voltage of the data driver 200 based on the data control signal, and control a supply timing of the scan signal of the scan driver 800 based on the scan control signal.

The power supply unit 400 may be mounted on the control circuit board 600, and may supply a power voltage to the display panel 100 and the data driver 200. For example, the power supply unit 400 may generate a driving voltage, a common voltage, an initialization voltage, a bias voltage, a gate high voltage, a gate low voltage, or a reference voltage. The power supply unit 400 may drive the plurality of pixels and the data driver 200 by supplying the power voltage.

The data circuit board 500 may be disposed on the pad portion disposed at one edge of the display panel 100. The data circuit board 500 may be attached to the pad portion using a conductive adhesive member such as an anisotropic conductive film. The data circuit board 500 may be electrically connected to signal lines of the display panel 100 through the anisotropic conductive film. The display panel 100 may receive the data voltage and the power voltage through the data circuit board 500. For example, the data circuit board 500 may be a flexible film such as a flexible printed circuit board, a printed circuit board, or a chip on film.

The control circuit board 600 may be attached to the data circuit board 500 using a low-resistance and high-reliability material such as an anisotropic conductive film or self-assembly anisotropic conductive paste (SAP). The control circuit board 600 may be electrically connected to the data circuit board 500. The control circuit board 600 may be a flexible printed circuit board or a printed circuit board.

Figure 2:
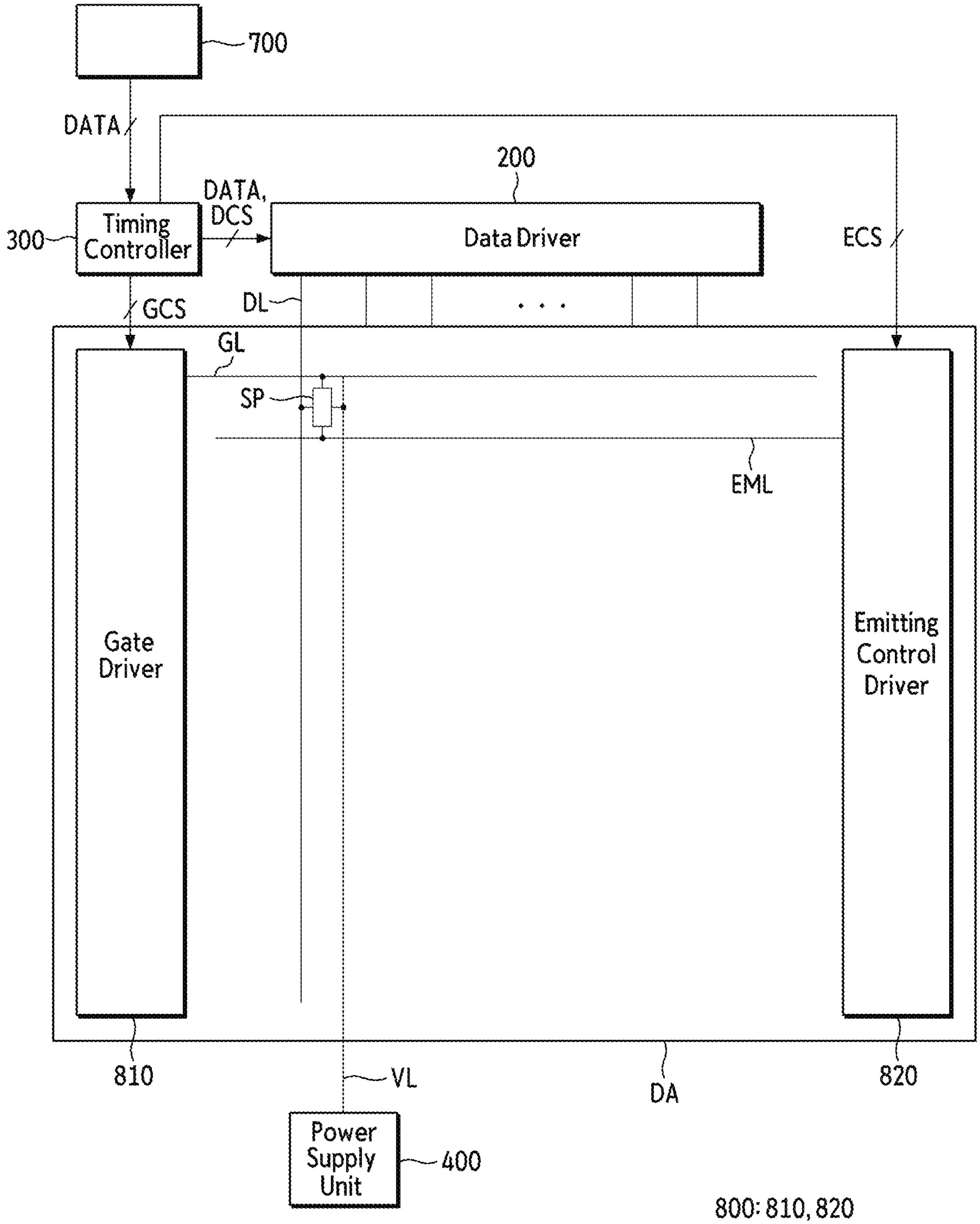
FIG. 2 is a block diagram illustrating the display device according to an embodiment.

FIG. 2 is a block diagram illustrating the display device according to an embodiment.

Referring to FIG. 2, the display panel 100 may include a display area DA and a non-display area NDA, e.g., see the non-display area NDA of FIG. 1. The display area DA may include pixels SP, gate lines GL, light emitting control lines EML, data lines DL, voltage lines VL, and a scan driver 800.

Each of the plurality of pixels SP may be connected to the gate line GL, the data line DL, the light emitting control line EML, and the voltage line VL. Each of the plurality of pixels SP may include at least one transistor, a light emitting element, and a capacitor.

The gate lines GL may extend in the X-axis direction and may be spaced apart from each other in the Y-axis direction that intersects the X-axis direction. The gate lines GL may sequentially supply a gate signal to the plurality of pixels SP.

The light emitting control lines EML may extend in the X-axis direction and may be spaced apart from each other in the Y-axis direction. The light emitting control lines EML may sequentially supply a light emitting signal to the plurality of pixels SP.

The data lines DL may extend in the Y-axis direction and may be spaced apart from each other in the X-axis direction. The data lines DL may supply the data voltage received from the data driver 200 to the pixels SP. The data voltage may determine a luminance of each of the pixels SP.

The voltage lines VL may extend in the Y-axis direction and may be spaced apart from each other in the X-axis direction. The voltage lines VL may supply the power voltage to the plurality of pixels SP. The power voltage may include at least one of a driving voltage, a common voltage, an initialization voltage, a bias voltage, a gate high voltage, a gate low voltage, and a reference voltage. For example, the driving voltage may be a high potential voltage for driving the light emitting element of the pixel SP, and the common voltage may be a low potential voltage for driving the light emitting element of the pixel SP.

A gate driver 810 may be disposed on one side of the display area DA, and a light emitting control driver 820 may be disposed on the other side of the display area DA, but the present disclosure is not limited thereto. As another example, the gate driver 810 and the light emitting control driver 820 may be disposed on either one side or the other side of the display area DA. The scan driver 800 may include the gate driver 810 and the light emitting control driver 820.

The gate driver 810 may include a plurality of transistors that generate a gate signal based on a gate control signal GCS. The light emitting control driver 820 may include a plurality of transistors that generate a light emitting signal based on a light emitting control signal ECS. For example, the gate driver 810 and the light emitting control driver 820 may include transistors disposed in a first active layer including a first material, and the pixels SP may include transistors disposed in a second active layer including a second material different from the first material. The gate driver 810 may supply the gate signal to the gate line GL, and the light emitting control driver 820 may supply the light emitting signal to the light emitting control line EML.

The data driver 200 may convert digital video data DATA into analog data voltages and supply the analog data voltages to the data lines DL. The gate signals of the gate driver 810 may select the pixels SP to which the data voltage is supplied, and the selected pixels SP may receive the data voltage through the data lines DL.

The timing controller 300 may receive the digital video data DATA and timing signals from a graphics device 700. For example, the graphics device 700 may be a graphics card of the display device 10, but is not limited thereto. The timing controller 300 may generate a data control signal DCS based on the timing signals and supply the digital video data DATA and the data control signal DCS to the data driver 200, thereby controlling an operation timing of the data driver 200. The timing controller 300 may generate the gate control signal GCS based on the timing signals and supply the gate control signal GCS to the gate driver 810, thereby controlling an operation timing of the gate driver 810. The timing controller 300 may generate the light emitting control signal ECS based on the timing signals and supply the light emitting control signal ECS to the light emitting control driver 820, thereby controlling an operation timing of the light emitting control driver 820. The timing controller 300 may vary a driving frequency of the display panel 100 based on an input frequency of the digital video data DATA of the graphics device 700.

The power supply unit 400 may be disposed on the data circuit board 500 and may supply the power voltage to the data driver 200 and the display panel 100. The power supply unit 400 may generate a driving voltage and supply the driving voltage to a driving voltage line, and may generate a common voltage and supply the common voltage to a common electrode common to the light emitting elements of the pixel. The power supply unit 400 may generate an initialization voltage and supply the initialization voltage to an initialization voltage line, and may generate a bias voltage and supply the bias voltage to a bias voltage line. The power supply unit 400 may generate a gate high voltage and supply the gate high voltage to a gate high voltage line, may generate a gate low voltage and supply the gate low voltage to a gate low voltage line, and may generate a reference voltage and supply the reference voltage to a reference voltage line.

Figure 3:
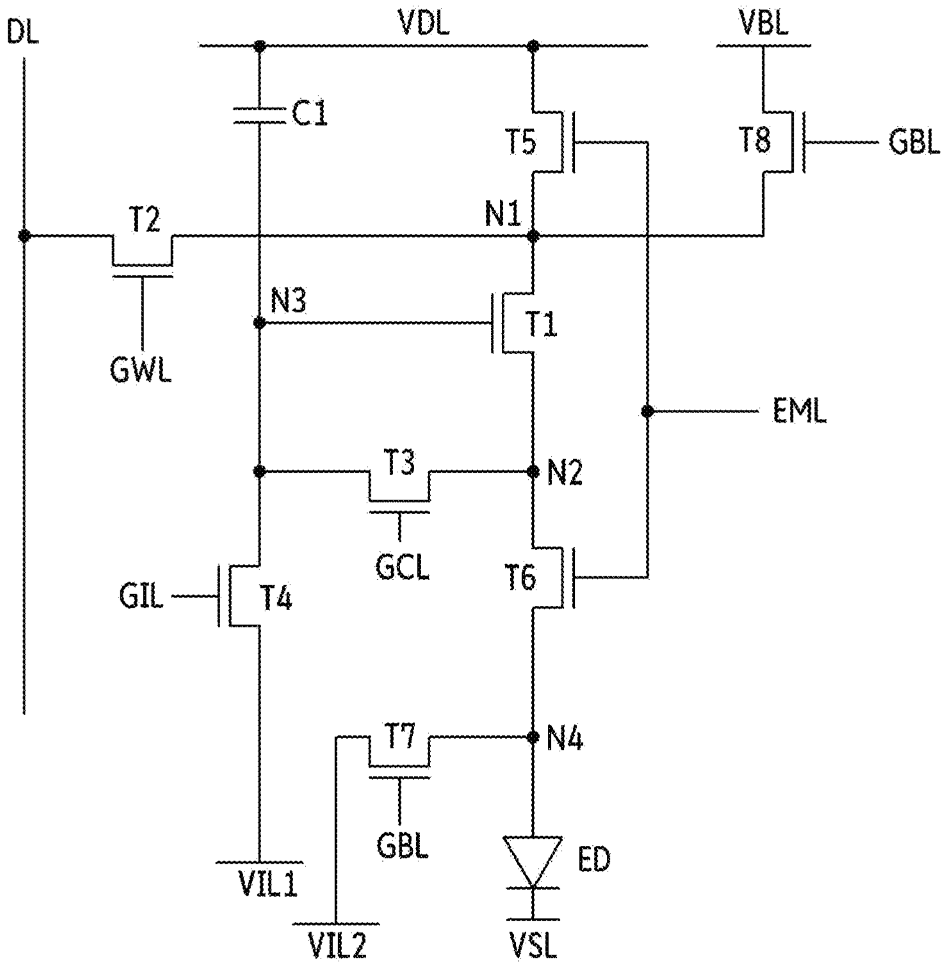
FIG. 3 is a circuit diagram illustrating a pixel of the display device according to an embodiment.

FIG. 3 is a circuit diagram illustrating a pixel of the display device according to an embodiment.

Referring to FIG. 3, the display panel 100 may include a plurality of pixels SP arranged along a plurality of rows and columns. Each of the plurality of pixels SP may be connected to a first gate line GWL, a second gate line GCL, a third gate line GIL, a fourth gate line GBL, a light emitting control line EML, a data line DL, a driving voltage line VDL, a first initialization voltage line VIL1, a second initialization voltage line VIL2, a bias voltage line VBL, and a low potential line VSL.

The pixel SP may include a light emitting element ED and a pixel circuit that drives the light emitting element ED. The pixel circuit may include first to eighth transistors T1, T2, T3, T4, T5, T6, T7, and T8 and a capacitor C1.

The first transistor T1 may control a driving current supplied to the light emitting element ED. The first transistor T1 may include a gate electrode, a first electrode, and a second electrode. The gate electrode of the first transistor T1 may be connected to a third node N3, the first electrode of the first transistor T1 may be connected to a first node N1, and the second electrode of the first transistor T1 may be connected to a second node N2. For example, the first electrode of the first transistor T1 may be a drain electrode, and the second electrode thereof may be a source electrode, but are not limited thereto.

The first transistor T1 may control a drain-source current Ids (hereinafter referred to as a "driving current") according to a data voltage applied to the gate electrode thereof. The driving current Ids flowing through a channel of the first transistor T1 may be proportional to a square of a difference between a voltage Vgs between the gate electrode and the source electrode of the first transistor T1 and a threshold voltage Vth ($Isd=k\times(Vgs-Vth)^2$). Here, k is a proportional coefficient determined by the structure and physical characteristics of the first transistor T1, Vgs is a gate-source voltage of the first transistor T1, and Vth is a threshold voltage of the first transistor T1.

The light emitting element ED may emit light by receiving the driving current Ids. The amount of light emitted from or luminance of the light emitting element ED may be proportional to the magnitude of the driving current Ids. The light emitting element ED may include a first electrode, a second electrode, and a light emitting layer disposed between the first electrode and the second electrode. The first electrode of the light emitting element ED may be connected to a fourth node N4. The first electrode of the light emitting element ED may be electrically connected to a second electrode of the sixth transistor T6 and a first electrode of the seventh transistor T7 through the fourth node N4. The second electrode of the light emitting element ED may be electrically connected to the low potential line VSL and may receive a low potential voltage from the low potential line VSL. For example, the first electrode of the light emitting element ED may be an anode electrode or a pixel electrode, and the second electrode thereof may be a cathode electrode or a common electrode, but are not limited thereto.

The second transistor T2 may be turned on by a first gate signal of the first gate line GWL and electrically connect the data line DL and the first node N1, which is the first electrode of the first transistor T1. The first gate line GWL may correspond to a scan write line. The second transistor T2 may be turned on based on the first gate signal, thereby supplying the data voltage to the first node N1. A gate electrode of the second transistor T2 may be connected to the first gate line GWL, a first electrode thereof may be connected to the data line DL, and a second electrode thereof may be connected to the first node N1. The second electrode of the second transistor T2 may be electrically connected to the first electrode of the first transistor T1, a second electrode of the fifth transistor T5, and a second electrode of the eighth transistor T8 through the first node N1. For example, the first electrode of the second transistor T2 may be a drain electrode, and the second electrode thereof may be a source electrode, but are not limited thereto.

The third transistor T3 may be turned on by a second gate signal of the second gate line GCL and may electrically connect the second node N2, which is the second electrode of the first transistor T1, and the third node N3, which is the gate electrode of the first transistor T1. A gate electrode of the third transistor T3 may be connected to the second gate line GCL, a first electrode thereof may be connected to the second node N2, and a second electrode thereof may be connected to the third node N3. The first electrode of the third transistor T3 may be electrically connected to the second electrode of the first transistor T1 and a first electrode of the sixth transistor T6 through the second node N2. The second electrode of the third transistor T3 may be electrically connected to the gate electrode of the first transistor T1, a first electrode of the fourth transistor T4, and a first capacitor electrode of the capacitor C1 through the third node N3. For example, the first electrode of the third transistor T3 may be a drain electrode, and the second electrode thereof may be a source electrode, but are not limited thereto.

The fourth transistor T4 may be turned on by a third gate signal of the third gate line GIL and may electrically connect the third node N3, which is the gate electrode of the first transistor T1, and the first initialization voltage line VIL1. The fourth transistor T4 may be turned on based on the third gate signal, thereby initializing the gate electrode of the first transistor T1 to the first initialization voltage. A gate electrode of the fourth transistor T4 may be connected to the third gate line GIL, a first electrode thereof may be connected to the third node N3, and a second electrode thereof may be connected to the first initialization voltage line VIL1. The first electrode of the fourth transistor T4 may be electrically connected to the gate electrode of the first transistor T1, the second electrode of the third transistor T3, and the first capacitor electrode of the capacitor C1 through the third node N3. For example, the first electrode of the fourth transistor T4 may be a drain electrode, and the second electrode thereof may be a source electrode, but are not limited thereto.

The fifth transistor T5 may be turned on by the light emitting signal of the light emitting control line EML and may electrically connect the driving voltage line VDL and the first node N1, which is the first electrode of the first transistor T1. A gate electrode of the fifth transistor T5 may be connected to the light emitting control line EML, a first electrode thereof may be connected to the driving voltage line VDL, and a second electrode thereof may be connected to the first node N1. The second electrode of the fifth transistor T5 may be electrically connected to the first electrode of the first transistor T1, the second electrode of the second transistor T2, and the second electrode of the eighth transistor T8 through the first node N1. For example, the first electrode of the fifth transistor T5 may be a drain electrode, and the second electrode thereof may be a source electrode, but are not limited thereto.

The sixth transistor T6 may be turned on by the light emitting signal of the light emitting control line EML and may electrically connect the second node N2, which is the second electrode of the first transistor T1, and the fourth node N4, which is the first electrode of the light emitting element ED. A gate electrode of the sixth transistor T6 may be connected to the light emitting control line EML, a first electrode thereof may be connected to the second node N2, and a second electrode thereof may be connected to the fourth node N4. The first electrode of the sixth transistor T6 may be electrically connected to the second electrode of the first transistor T1 and the first electrode of the third transistor T3 through the second node N2. The second electrode of the sixth transistor T6 may be electrically connected to the first electrode of the light emitting element ED and the first electrode of the seventh transistor T7 through the fourth node N4. For example, the first electrode of the sixth transistor T6 may be a drain electrode, and the second electrode thereof may be a source electrode, but are not limited thereto.

When the fifth transistor T5, the first transistor T1, and the sixth transistor T6 are all turned on, the driving current Ids may be supplied to the light emitting element ED.

The seventh transistor T7 may be turned on by a fourth gate signal of the fourth gate line GBL and may electrically connect the second initialization voltage line VIL2 and the fourth node N4, which is the first electrode of the light emitting element ED. The seventh transistor T7 may be turned on based on the fourth gate signal, thereby initializing the first electrode of the light emitting element ED to the second initialization voltage. Here, the second initialization voltage of the second initialization voltage line VIL2 may be different from the first initialization voltage of the first initialization voltage line VIL1. As another example, the second initialization voltage may be the same as the first initialization voltage. A gate electrode of the seventh transistor T7 may be connected to the fourth gate line GBL, a first electrode thereof may be connected to the fourth node N4, and a second electrode thereof may be connected to the second initialization voltage line VIL2. The second electrode of the seventh transistor T7 may be electrically connected to the first electrode of the light emitting element ED and the second electrode of the sixth transistor T6 through the fourth node N4. For example, the first electrode of the seventh transistor T7 may be a drain electrode, and the second electrode thereof may be a source electrode, but are not limited thereto.

The eighth transistor T8 may be turned on by the fourth gate signal of the fourth gate line GBL and electrically connect the bias voltage line VBL and the first node N1, which is the first electrode of the first transistor T1. A gate electrode of the eighth transistor T8 may be connected to the fourth gate line GBL, a first electrode thereof may be connected to the bias voltage line VBL, and a second electrode thereof may be connected to the first node N1. The second electrode of the eighth transistor T8 may be electrically connected to the first electrode of the first transistor T1, the second electrode of the second transistor T2, and the second electrode of the fifth transistor T5 through the first node N1. For example, the first electrode of the eighth transistor T8 may be a drain electrode, and the second electrode thereof may be a source electrode, but are not limited thereto. Optionally, the eighth transistor T8 may be omitted.

The first to eighth transistors T1, T2, T3, T4, T5, T6, T7, and T8 may include an oxide-based semiconductor area. For example, the first to eighth transistors T1, T2, T3, T4, T5, T6, T7, and T8 may have a coplanar structure in which a gate electrode is disposed above the oxide-based semiconductor area. A transistor with a coplanar structure may have excellent leakage current characteristics and may be driven at low frequencies, thereby reducing power consumption. Therefore, the display device 10 includes the first to eighth transistors T1, T2, T3, T4, T5, T6, T7, and T8 with excellent leakage current characteristics, thereby preventing leakage current from flowing inside the pixel and stably keeping the voltage inside the pixel.

The first to eighth transistors T1, T2, T3, T4, T5, T6, T7, and T8 may correspond to n-type transistors. For example, the first to eighth transistors T1, T2, T3, T4, T5, T6, T7, and T8 may output a current flowing into the first electrode to the second electrode based on the gate high voltage applied to the gate electrode.

As another example, at least one of the first to eighth transistors T1, T2, T3, T4, T5, T6, T7, and T8 may include a silicon-based semiconductor area. For example, at least one of the first to eighth transistors T1, T2, T3, T4, T5, T6, T7, and T8 may include a semiconductor area made of low temperature polycrystalline silicon (LTPS). The semiconductor region made of low temperature polycrystalline silicon may have high electron mobility and excellent turn-on characteristics. At least one of the first to eighth transistors T1, T2, T3, T4, T5, T6, T7, and T8 may correspond to a p-type transistor. The p-type transistor may output a current flowing into the first electrode to the second electrode based on the gate low voltage applied to the gate electrode.

The capacitor C1 may be connected between the third node N3, which is the gate electrode of the first transistor T1, and the driving voltage line VDL. For example, the first capacitor electrode of the capacitor C1 may be connected to the third node N3, and the second capacitor electrode of the capacitor C1 may be connected to the driving voltage line VDL, thereby maintaining a potential difference between the driving voltage line VDL and the gate electrode of the first transistor T1.

Figure 4:
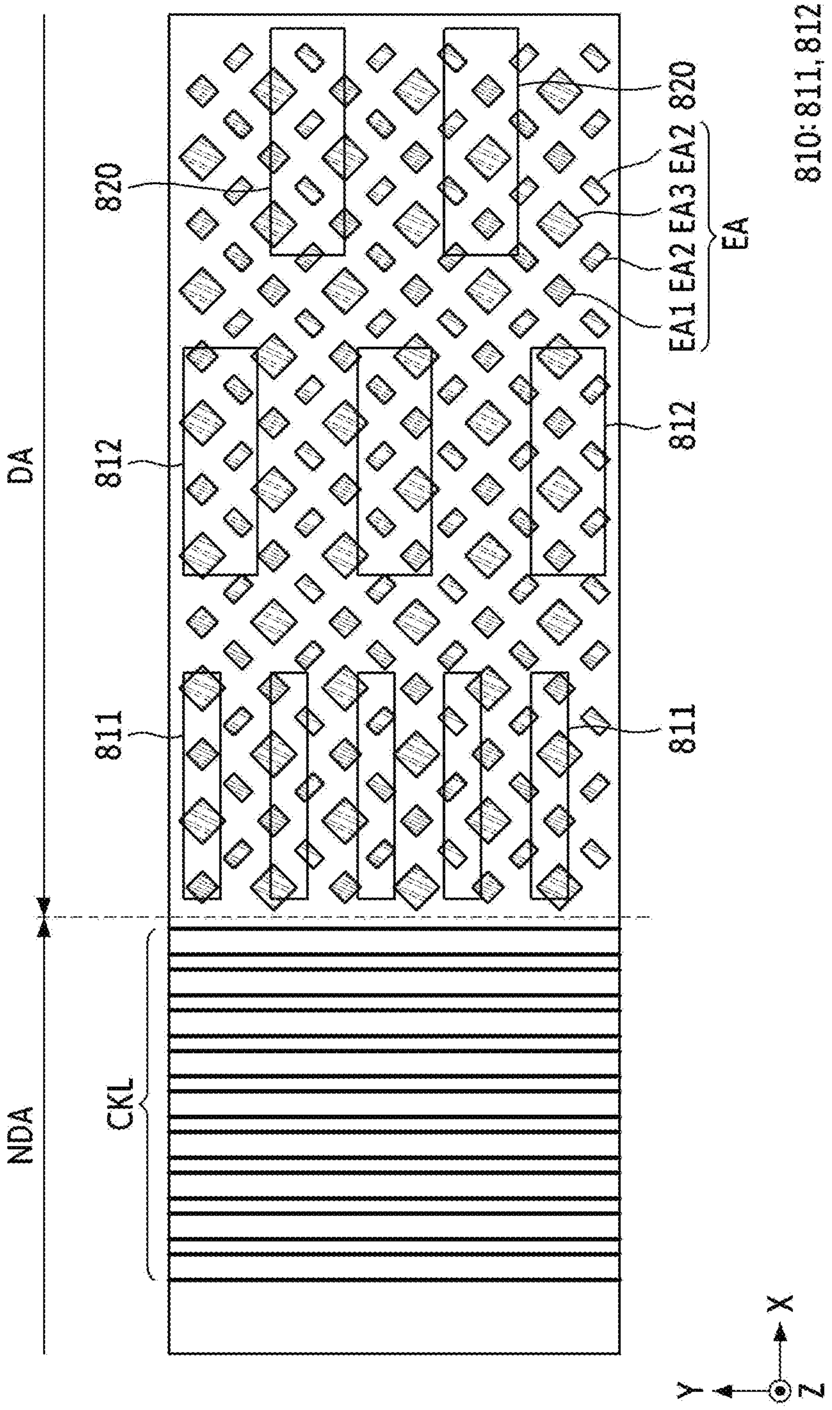
FIG. 4 is a plan view illustrating a light emitting area, a gate driver, and a clock line of the display device according to an embodiment.

FIG. 4 is a plan view illustrating a light emitting area EA, a gate driver 810, and a clock line CKL of the display device according to an embodiment.

Referring to FIG. 4, the display area DA may include a plurality of light emitting areas EA. The light emitting area EA may emit light from the light emitting element ED. The light emitting area EA may include first to third light emitting areas EA1, EA2, and EA3. For example, the first light emitting area EA1 may emit light of a first color or red light, the second light emitting area EA2 may emit light of a second color or green light, and the third light emitting area EA3 may emit light of a third color or blue light, but the present disclosure is not limited thereto.

One unit pixel may express a white grayscale by including one first light emitting area EA1, two second light emitting areas EA2, and one third light emitting area EA3, but the configuration of the unit pixel is not limited thereto. The white grayscale may be expressed by a combination of light emitted from one first light emitting area EA1, light emitted from the two second light emitting areas EA2, and light emitted from one third light emitting area EA3.

Areas of the first to third light emitting areas EA1, EA2, and EA3 may be different from each other. For example, the area of the third light emitting area EA3 may be greater than the area of the first light emitting area EA1, and the area of the first light emitting area EA1 may be greater than the area of the second light emitting area EA2, but is not limited thereto. As another example, the areas of the first to third light emitting areas EA1, EA2, and EA3 may be the same.

The gate driver 810 may include first and second gate drivers 811 and 812. The first gate driver 811 may supply the first gate signal to the first gate line GWL of FIG. 3. The second gate driver 812 may supply the second gate signal to the second gate line GCL of FIG. 3 and the third gate signal to the third gate line GIL.

The first gate driver 811 may overlap the light emitting areas EA. The first gate driver 811 may include a plurality of stages arranged in the Y-axis direction. The first gate driver 811 may be disposed on the outermost side of the display area DA in the scan driver 800. For example, the first gate driver 811 may be disposed on the left or right edge of the display area DA. The first gate driver 811 may be closest to the clock line CKL in the scan driver 800, e.g., see FIG. 2. Therefore, the display device 10 may improve signal sensitivity of the first gate driver 811. A length of the first gate driver 811 in the X-axis direction may be greater than a length thereof in the Y-axis direction.

The second gate driver 812 may overlap the light emitting areas EA. The second gate driver 812 may include a plurality of stages arranged in the Y-axis direction. The second gate driver 812 may be disposed inside the display area DA more than the first gate driver 811. The second gate driver 812 may be disposed between the first gate driver 811 and the light emitting control driver 820. The first gate driver 811 may be disposed between the clock line CKL and the second gate driver 812. A length of the second gate driver 812 in the X-axis direction may be greater than a length thereof in the Y-axis direction. The number of second gate drivers 812 may be smaller than the number of first gate drivers 811, and a width of the second gate driver 812 in the Y-axis direction may be greater than a width of the first gate driver 811 in the Y-axis direction, but the present disclosure is not limited.

The light emitting control driver 820 may overlap the light emitting areas EA. The light emitting control driver 820 may include a plurality of stages arranged in the Y-axis direction. The light emitting control driver 820 may be disposed inside the display area DA more than the first and second gate drivers 811 and 812. The light emitting control driver 820 may not be disposed in the X-axis direction of the second gate driver 812, but may be disposed in a diagonal direction between the X-axis and the Y-axis. The light emitting control driver 820 and the second gate driver 812 may not be disposed in the same row. A length of the light emitting control driver 820 in the X-axis direction may be greater than a length thereof in the Y-axis direction. The number of light emitting control drivers 820 may be smaller than the number of first gate drivers 811, and a width of the light emitting control driver 820 in the Y-axis direction may be greater than a width of the first gate driver 811 in the Y-axis direction, but the present disclosure is not limited thereto.

The clock line CKL may be disposed in the non-display area NDA and extend in the Y-axis direction. The clock line CKL may be disposed adjacent to the display area DA to supply a clock signal to the scan driver 800. The clock line CKL may be disposed closest to the first gate driver 811 in the scan driver 800. The clock line CKL may not overlap the light emitting area EA. By being disposed in the non-display area NDA, the clock line CKL may prevent coupling with the pixel circuit or signal lines of the pixel SP in the display area DA.

Therefore, the display device 10 includes the scan driver 800 disposed in the display area DA, thereby reducing an area of the non-display area NDA and reducing power consumption.

Figure 5:
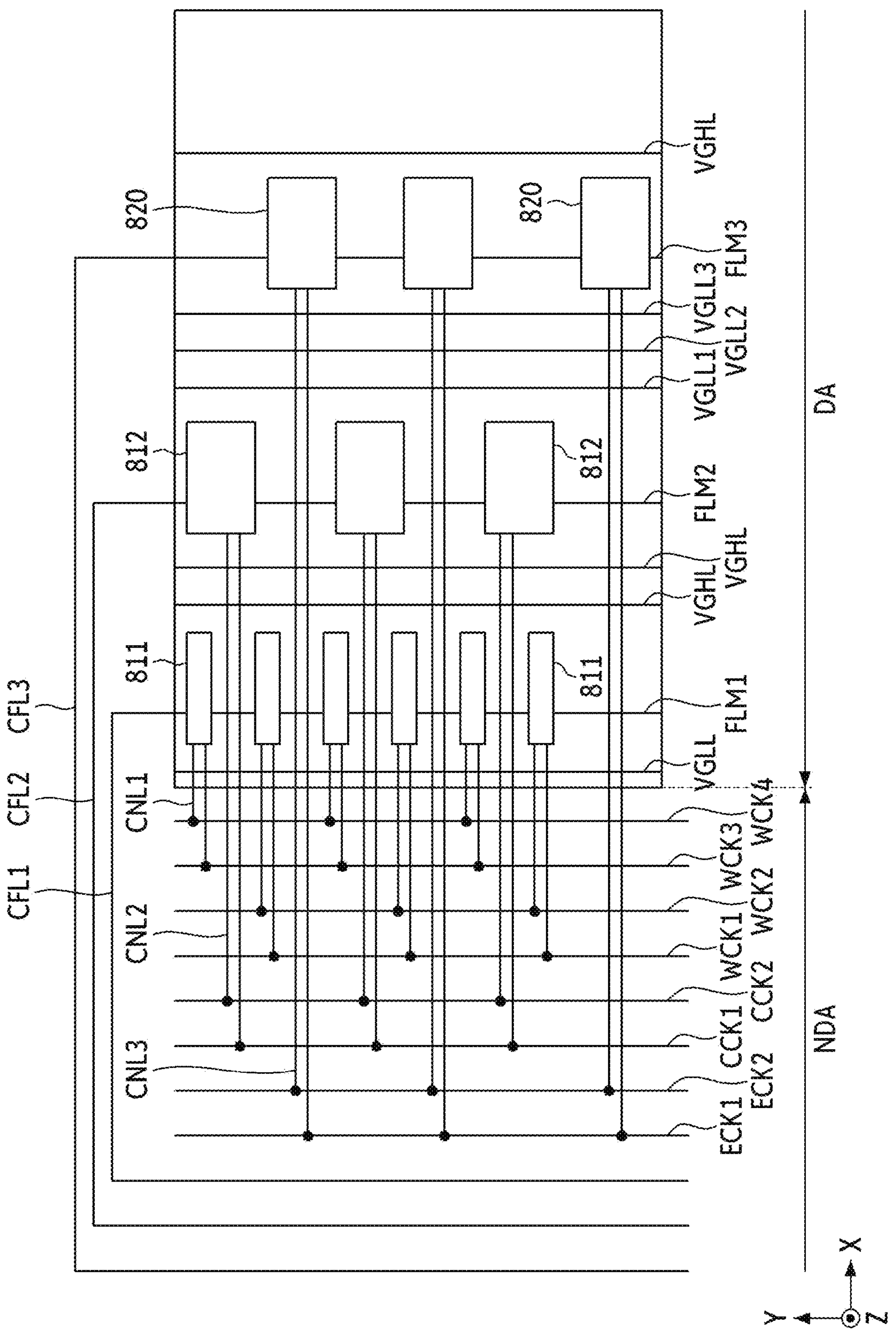
FIG. 5 is a plan view illustrating a connection relationship between the gate driver and the clock line of the display device according to an embodiment.

FIG. 5 is a plan view illustrating a connection relationship between the gate driver 810 and the clock line CKL of the display device according to an embodiment.

Referring to FIG. 5, the clock line CKL may include first to fourth write clock lines WCK1, WCK2, WCK3, and WCK4, first and second control clock lines CCK1 and CCK2, and first and second light emitting clock lines ECK1 and ECK2.

The first to fourth write clock lines WCK1, WCK2, WCK3, and WCK4 may extend in the Y-axis direction and be spaced apart from each other in the X-axis direction. The first to fourth write clock lines WCK1, WCK2, WCK3, and WCK4 may be closest to the display area DA among the clock lines CKL. The first to fourth write clock lines WCK1, WCK2, WCK3, and WCK4 may supply a clock signal to the first gate driver 811 through a first connection line CNL1. The first connection line CNL1 may extend in the X-axis direction from the non-display area NDA to the display area DA. The first connection line CNL1 may intersect a gate low voltage line VGLL in the display area DA.

The gate low voltage line VGLL and the gate high voltage line VGHL may be disposed on both sides of the first gate driver 811 and extend in the Y-axis direction. The gate low voltage line VGLL and the gate high voltage line VGHL may be disposed in the display area DA and electrically connected to the first gate driver 811.

The first and second control clock lines CCK1 and CCK2 may extend in the Y-axis direction and be spaced apart from each other in the X-axis direction. The first and second control clock lines CCK1 and CCK2 may be closer to the display area DA than the first and second light emitting clock lines ECK1 and ECK2. The first and second control clock lines CCK1 and CCK2 may supply a clock signal to the second gate driver 812 through a second connection line CNL2. The second connection line CNL2 may extend in the X-axis direction from the non-display area NDA to the display area DA. The second connection line CNL2 may pass between the stages of the first gate driver 811 adjacent to each other in the Y-axis direction. The second connection line CNL2 may intersect the first to fourth write clock lines WCK1, WCK2, WCK3, and WCK4 in the non-display area NDA, and may intersect the gate low voltage line VGLL and the gate high voltage line VGHL in the display area DA.

The gate high voltage line VGHL and first and second gate low voltage lines VGLL1 and VGLL2 may be disposed on both sides of the second gate driver 812 and extend in the Y-axis direction. The gate high voltage line VGHL and the first and second gate low voltage lines VGLL1 and VGLL2 may be disposed in the display area DA and electrically connected to the second gate driver 812.

The first and second light emitting clock lines ECK1 and ECK2 may extend in the Y-axis direction and be spaced apart from each other in the X-axis direction. The first and second light emitting clock lines ECK1 and ECK2 may be furthest from the display area DA among the clock lines CKL. The first and second light emitting clock lines ECK1 and ECK2 may supply a clock signal to the light emitting control driver 820 through a third connection line CNL3. The third connection line CNL3 may extend in the X-axis direction from the non-display area NDA to the display area DA. The third connection line CNL3 may pass between the stages of the first gate driver 811 adjacent to each other in the Y-axis direction, and may pass between the stages of the second gate driver 812 adjacent to each other in the Y-axis direction. The third connection line CNL3 may intersect the first to fourth write clock lines WCK1, WCK2, WCK3, and WCK4 and the first and second control clock lines CCK1 and CCK2 in the non-display area NDA, and may intersect the gate low voltage line VGLL and the gate high voltage line VGHL in the display area DA.

A gate low voltage line VGLL3 and the gate high voltage line VGHL may be disposed on both sides of the light emitting control driver 820 and extend in the Y-axis direction. The gate low voltage line VGLL3 and the gate high voltage line VGHL may be disposed in the display area DA and electrically connected to the light emitting control driver 820.

First to third start connection lines CFL1, CFL2, and CFL3 may pass through the left and upper sides of the non-display area NDA and be electrically connected to first to third start lines FLM1, FLM2, and FLM3 of the display area DA. Each of the first to third start connection lines CFL1, CFL2, and CFL3 may include a first portion extending in the Y-axis direction from the left side of the non-display area NDA, a second portion bent from the first portion and extending in the X-axis direction from an upper side of the non-display area NDA, and a third portion bent from the second portion and extending to the display area DA. The first portions of the first to third start connection lines CFL1, CFL2, and CFL3 may be spaced further apart from the display area DA than the clock lines CKL on the left side of the non-display area NDA. The first start connection line CFL1 may supply a first start signal to the first start line FLM1 electrically connected to the first gate driver 811, the second start connection line CFL2 may supply a second start signal to the second start line FLM2 electrically connected to the second gate driver 812, and the third start connection line CFL3 may supply a third start signal to the third start line FLM3 electrically connected to the light emitting control driver 820.

Figure 6:
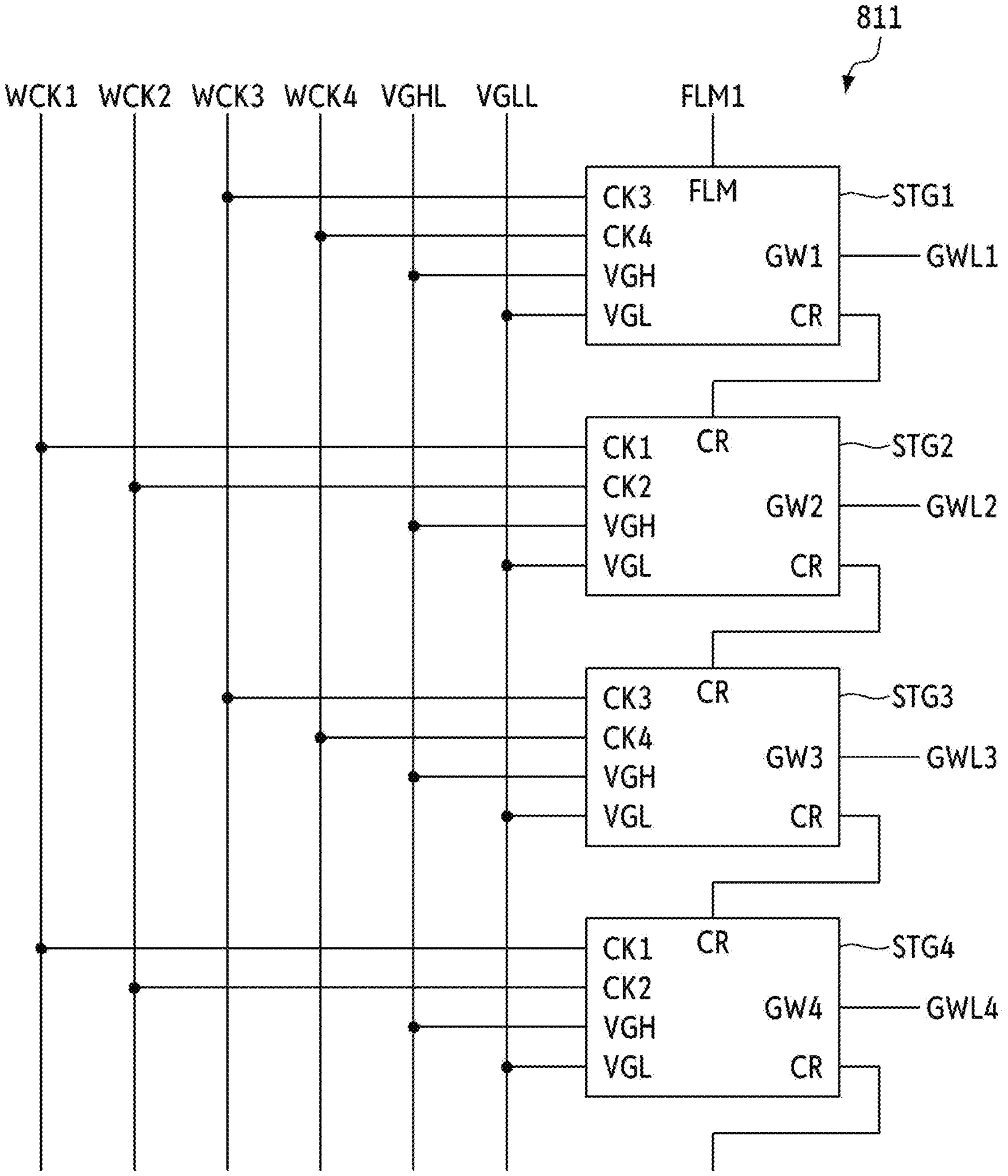
FIG. 6 is a block diagram illustrating a first gate driver of the display device according to an embodiment.

FIG. 6 is a block diagram illustrating a first gate driver 811 of the display device according to an embodiment.

Referring to FIG. 6, the first gate driver 811 may include a plurality of stages STG. The first to fourth write clock lines WCK1, WCK2, WCK3, and WCK4 may supply first to fourth clock signals CK1, CK2, CK3, and CK4 to the stages STG. The gate high voltage line VGHL may supply a gate high voltage VGH to the stages STG, and the gate low voltage line VGLL may supply a gate low voltage VGL to the stages STG. The stages STG may generate a first gate signal or a scan write signal and supply the generated signal to the first gate line GWL or the scan write line of FIG. 3. The stages STG may include first to fourth stages STG1, STG2, STG3, and STG4.

The first stage STG1 may be connected to the first start line FLM1 and may receive a start signal FLM. The first stage STG1 may receive the third and fourth clock signals CK3 and CK4, the gate high voltage VGH, and the gate low voltage VGL, and supply a first scan write signal GW1 to the first scan write line GWL1.

The second stage STG2 may receive a carry signal CR from the first stage STG1. The second stage STG2 may receive the first and second clock signals CK1 and CK2, the gate high voltage VGH, and the gate low voltage VGL, and supply a second scan write signal GW2 to the second scan write line GWL2.

The third stage STG3 may receive a carry signal CR from the second stage STG2. The third stage STG3 may receive the third and fourth clock signals CK3 and CK4, the gate high voltage VGH, and the gate low voltage VGL, and supply a third scan write signal GW3 to the third scan write line GWL3.

The fourth stage STG4 may receive a carry signal CR from the third stage STG3. The fourth stage STG4 may receive the first and second clock signals CK1 and CK2, the gate high voltage VGH, and the gate low voltage VGL, and supply a fourth scan write signal GW4 to the fourth scan write line GWLA.

Figure 7:
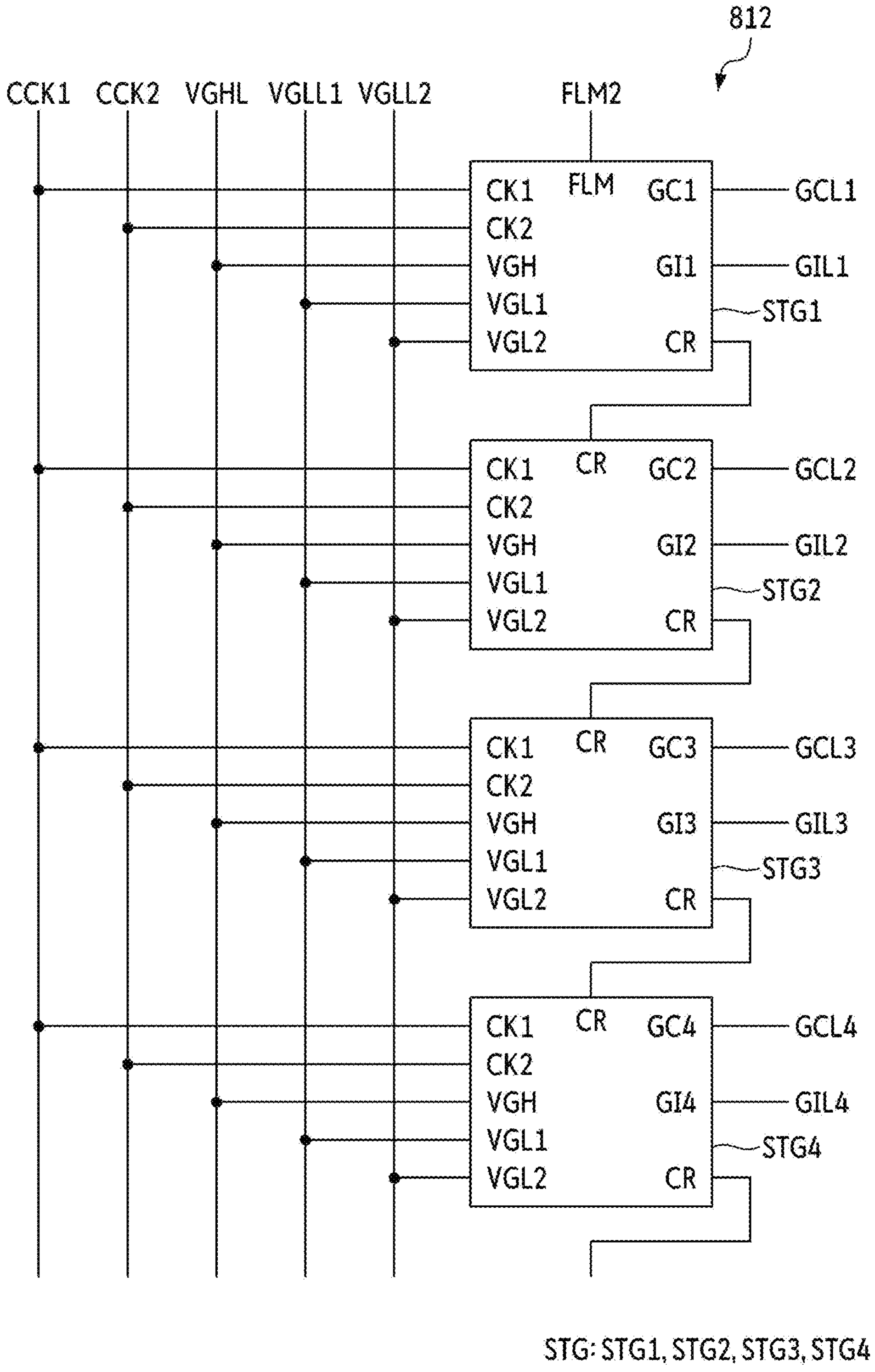
FIG. 7 is a block diagram illustrating a second gate driver of the display device according to an embodiment.

FIG. 7 is a block diagram illustrating a second gate driver 812 of the display device according to an embodiment.

Referring to FIG. 7, the second gate driver 812 may include a plurality of stages STG. The first and second control clock lines CCK1 and CCK2 may supply first and second clock signals CK1 and CK2 to the stages STG. The gate high voltage line VGHL may supply a gate high voltage VGH to the stages STG, the first gate low voltage line VGLL1 may supply a first gate low voltage VGL1 to the stages STG, and the second gate low voltage line VGLL2 may supply a second gate low voltage VGL2 to the stages STG. The stages STG may generate a second gate signal or a scan control signal and supply the generated signal to the second gate line GCL or the scan control line of FIG. 3. The stages STG may generate a third gate signal or a scan initialization signal and supply the generated signal to the third gate line GIL or the scan initialization line of FIG. 3.

The stages STG may include first to fourth stages STG1, STG2, STG3, and STG4.

The first stage STG1 may be connected to the second start line FLM2 and may receive a start signal FLM. The first stage STG1 may receive the first and second clock signals CK1 and CK2, the gate high voltage VGH, and the first and second gate low voltages VGL1 and VGL2 to supply a first scan control signal GC1 to a first scan control line GCL1 and supply a first scan initialization signal GI1 to a first scan initialization line GIL1.

The second stage STG2 may receive a carry signal CR from the first stage STG1. The second stage STG2 may receive the first and second clock signals CK1 and CK2, the gate high voltage VGH, and the first and second gate low voltages VGL1 and VGL2 to supply a second scan control signal GC2 to a second scan control line GCL2 and supply a second scan initialization signal GI2 to a second scan initialization line GIL2.

The third stage STG3 may receive a carry signal CR from the second stage STG2. The third stage STG3 may receive the first and second clock signals CK1 and CK2, the gate high voltage VGH, and the first and second gate low voltages VGL1 and VGL2 to supply a third scan control signal GC3 to a third scan control line GCL3 and supply a third scan initialization signal GI3 to a third scan initialization line GIL3.

The fourth stage STG4 may receive a carry signal CR from the third stage STG3. The fourth stage STG4 may receive the first and second clock signals CK1 and CK2, the gate high voltage VGH, and the first and second gate low voltages VGL1 and VGL2 to supply a fourth scan control signal GC4 to a fourth scan control line GCL4 and supply a fourth scan initialization signal GI4 to a fourth scan initialization line GIL4.

Figure 8:
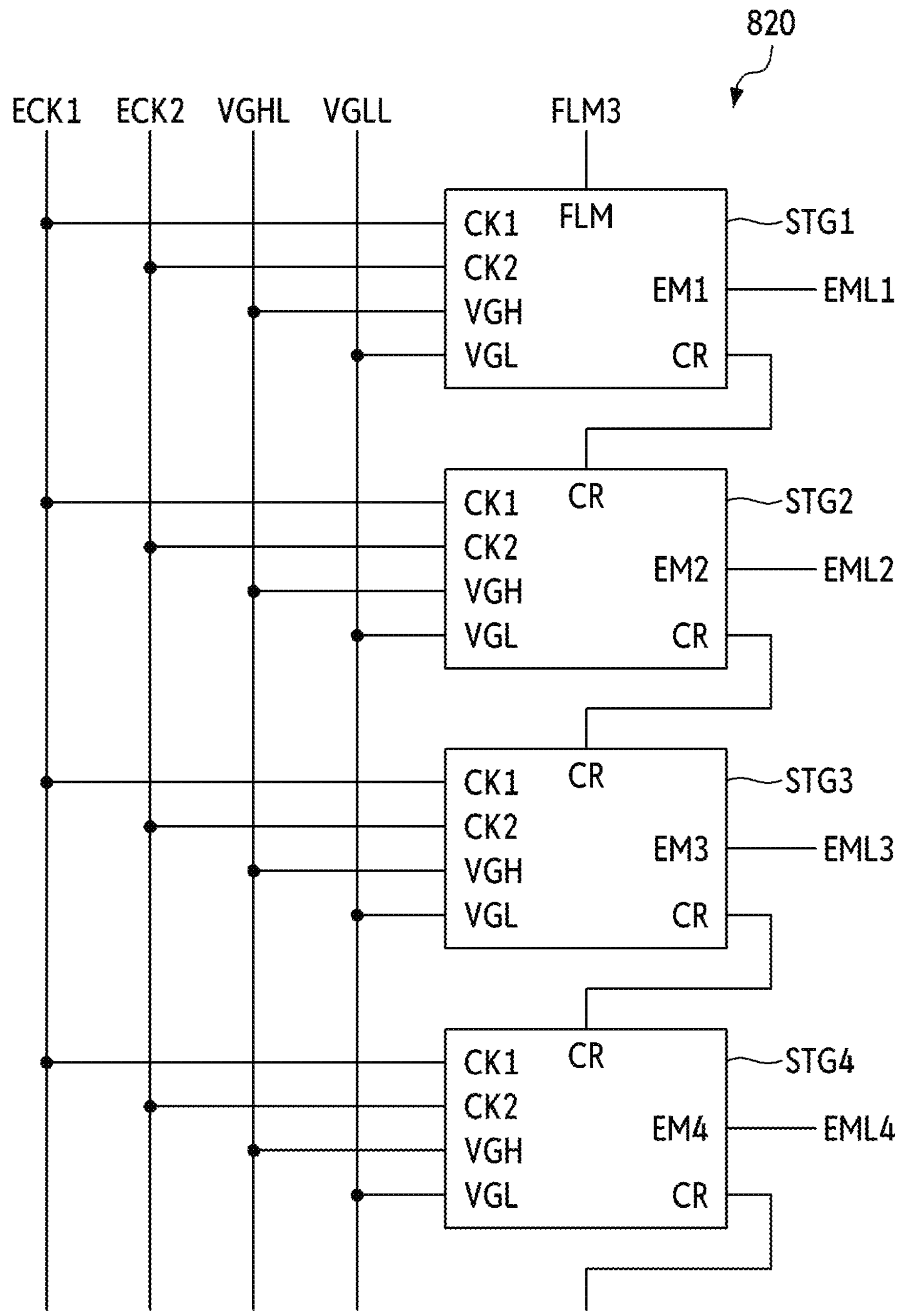
FIG. 8 is a block diagram illustrating a light emitting control driver of the display device according to an embodiment.

FIG. 8 is a block diagram illustrating a light emitting control driver 820 of the display device according to an embodiment.

Referring to FIG. 8, the light emitting control driver 820 may include a plurality of stages STG. The first and second light emitting clock lines ECK1 and ECK2 may supply first and second clock signals CK1 and CK2 to the stages STG. The gate high voltage line VGHL may supply a gate high voltage VGH to the stages STG, and the gate low voltage line VGLL may supply a gate low voltage VGL to the stages STG. The stages STG may generate a light emitting signal and supply generated signal to the light emitting control line EML of FIG. 3. The stages STG may include first to fourth stages STG1, STG2, STG3, and STG4.

The first stage STG1 may be connected to the third start line FLM3 and may receive a start signal FLM. The first stage STG1 may receive the first and second clock signals CK1 and CK2, the gate high voltage VGH, and the gate low voltage VGL, and supply a first light emitting signal EM1 to a first light emitting control line EML1.

The second stage STG2 may receive a carry signal CR from the first stage STG1. The second stage STG2 may receive the first and second clock signals CK1 and CK2, the gate high voltage VGH, and the gate low voltage VGL, and supply a second light emitting signal EM2 to a second light emitting control line EML2.

The third stage STG3 may receive a carry signal CR from the second stage STG2. The third stage STG3 may receive the first and second clock signals CK1 and CK2, the gate high voltage VGH, and the gate low voltage VGL, and supply a third light emitting signal EM3 to a third light emitting control line EML3.

The fourth stage STG4 may receive a carry signal CR from the third stage STG3. The fourth stage STG4 may receive the first and second clock signals CK1 and CK2, the gate high voltage VGH, and the gate low voltage VGL, and supply a fourth light emitting signal EM4 to a fourth light emitting control line EML4.

Figure 9:
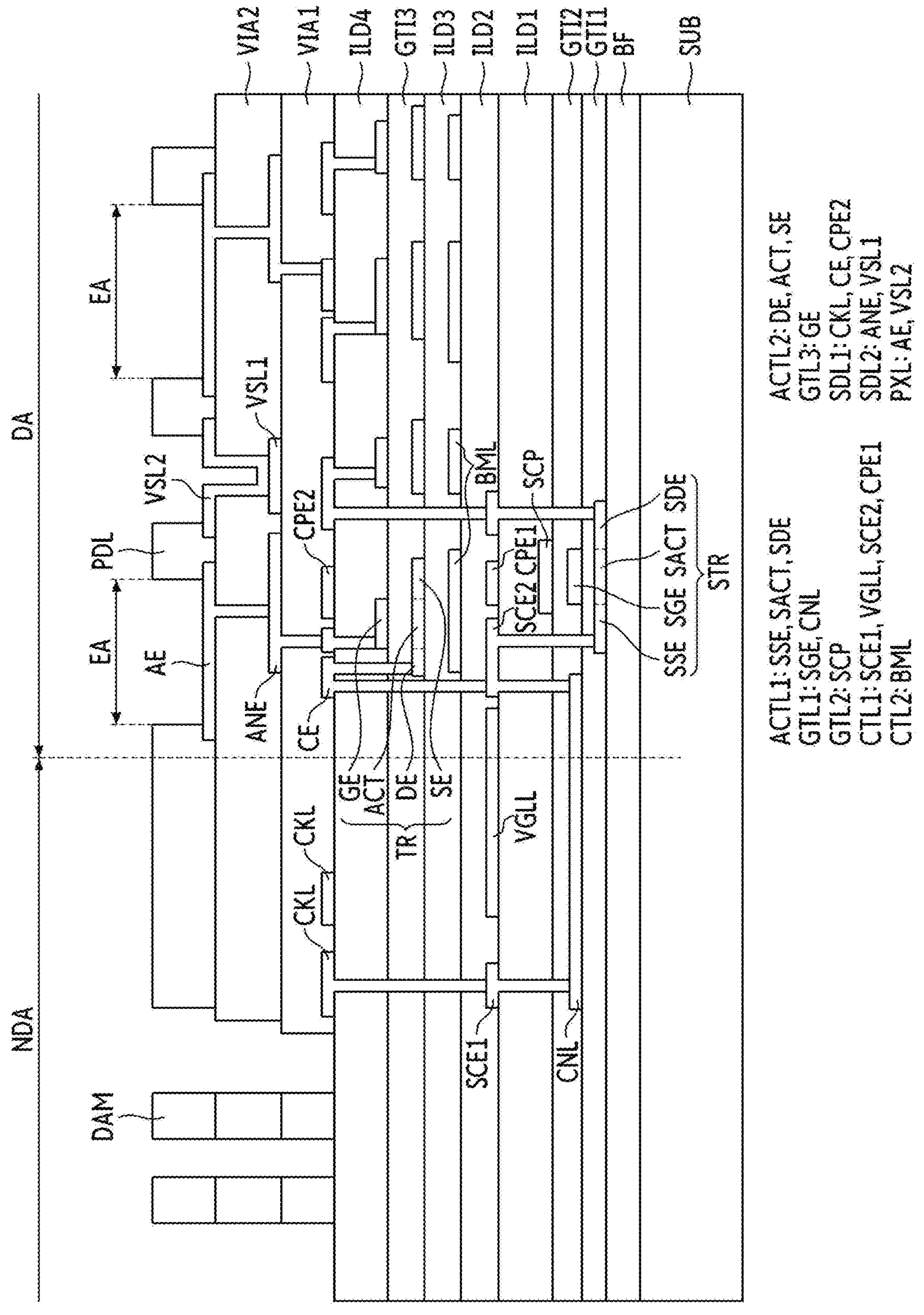
FIG. 9 is a cross-sectional view illustrating the display device according to an embodiment.

FIG. 9 is a cross-sectional view illustrating the display device according to an embodiment.

Referring to FIG. 9, the display panel 100 may include a substrate SUB, a buffer layer BF, a first active layer ACTL1, a first gate insulating layer GTI1, a first gate layer GTL1, a second gate insulating layer GTI2, a second gate layer GTL2, a first interlayer insulating layer ILD1, a first connection metal layer CTL1, a second interlayer insulating layer ILD2, a second connection metal layer CTL2, a third interlayer insulating layer ILD3, a second active layer ACTL2, a third gate insulating layer GTI3, a third gate layer GTL3, a fourth interlayer insulating layer ILD4, a first source metal layer SDL1, a first via layer VIA1, a second source metal layer SDL2, a second via layer VIA2, and a pixel electrode layer PXL.

The substrate SUB may be a base substrate or a base member. The substrate SUB may be a flexible substrate that may be bent, folded, rolled, or the like. For example, the substrate SUB may include a polymer resin such as polyimide (PI), but is not limited thereto. As another example, the substrate SUB may include a glass material or a metal material.

The buffer layer BF may be disposed on the substrate SUB. For example, the buffer layer BF may include an inorganic film capable of preventing permeation of air or moisture. For example, the buffer layer BF may include a plurality of inorganic films that are alternately stacked.

The first active layer ACTL1 may be disposed on the buffer layer BF. The first active layer ACTL1 may include a silicon-based material. For example, the first active layer ACTL1 may be made of low temperature polycrystalline silicon (LTPS). The first active layer ACTL1 may include a semiconductor area SACT, a first electrode SSE, and a second electrode SDE of a scan transistor STR.

The scan transistor STR may be disposed in the display area DA to form the scan driver 800. Therefore, the first and second gate drivers 811 and 812 and the light emitting control driver 820 may include a plurality of scan transistors STR disposed in the first active layer ACTL1 and the first gate layer GTL1. The scan transistor STR of the scan driver 800 may overlap the transistor TR of the pixel SP in the thickness direction (Z-axis direction).

The first gate insulating layer GTI1 may be disposed on the first active layer ACTL1. The first gate insulating layer GTI1 may insulate the first active layer ACTL1 and the first gate layer GTL1 from each other.

The first gate layer GTL1 may be disposed on the first gate insulating layer GTI1. The first gate layer GTL1 may include a gate electrode SGE of the scan transistor STR and a connection line CNL. The connection line CNL may be one of the first to third connection lines CNL1, CNL2, and CNL3 in FIG. 5, and may electrically connect the clock line CKL and the scan driver 800.

The second gate insulating layer GTI2 may be disposed on the first gate layer GTL1. The second gate insulating layer GTI2 may insulate the first gate layer GTL1 and the second gate layer GTL2 from each other.

The second gate layer GTL2 may be disposed on the second gate insulating layer GTI2. The second gate layer GTL2 may include a scan capacitor electrode SCP. The scan capacitor electrode SCP may overlap the gate electrode SGE of the scan transistor STR to form a scan capacitor of the scan driver 800.

The first interlayer insulating layer ILD1 may be disposed on the second gate layer GTL2. The first interlayer insulating layer ILD1 may insulate the second gate layer GTL2 and the first connection metal layer CTL1 from each other.

The first connection metal layer CTL1 may be disposed on the first interlayer insulating layer ILD1. The first connection metal layer CTL1 may include a first scan connection electrode SCE1, a gate low voltage line VGLL, a second scan connection electrode SCE2, and a first capacitor electrode CPE1. The first scan connection electrode SCE1 may electrically connect the clock line CKL and the connection line CNL. The gate low voltage line VGLL may supply the gate low voltage VGL to the scan driver 800. The second scan connection electrode SCE2 may electrically connect the connection line CNL, a connection electrode CE, and the first electrode SSE of the scan transistor STR. The first capacitor electrode CPE1 may overlap a metal layer BML to form the first capacitor of the pixel SP.

The second interlayer insulating layer ILD2 may be disposed on the first connection metal layer CTL1. The second interlayer insulating layer ILD2 may insulate the first connection metal layer CTL1 and the second connection metal layer CTL2 from each other.

The second connection metal layer CTL2 may be disposed on the second interlayer insulating layer ILD2. The second connection metal layer CTL2 may include the metal layer BML. The metal layer BML may overlap a semiconductor area ACT of the transistor TR and block light incident on the semiconductor area ACT of the transistor TR. The metal layer BML may receive a predetermined voltage and maintain a stable voltage, and may prevent coupling of the scan transistor STR and the transistor TR.

The third interlayer insulating layer ILD3 may be disposed on the second connection metal layer CTL2. The third interlayer insulating layer ILD3 may insulate the second connection metal layer CTL2 and the second active layer ACTL2 from each other.

The second active layer ACTL2 may be disposed on the third interlayer insulating layer ILD3. The second active layer ACTL2 may include an oxide-based material. The second active layer ACTL2 may include the semiconductor area ACT, a first electrode DE, and a second electrode SE of the transistor TR.

The transistor TR may be disposed in the display area DA to form a pixel SP. The transistor TR may be one of the first to eighth transistors T1, T2, T3, T4, T5, T6, T7, and T8 of FIG. 3. The transistor TR of the pixel SP and the scan transistor STR of the scan driver 800 may overlap in the thickness direction (Z-axis direction).

The third gate insulating layer GTI3 may be disposed on the second active layer ACTL2.

The third gate insulating layer GTI3 may insulate the second active layer ACTL2 and the third gate layer GTL3 from each other.

The third gate layer GTL3 may be disposed on the third gate insulating layer GTI3. The third gate layer GTL3 may include a gate electrode GE of the transistor TR.

The fourth interlayer insulating layer ILD4 may be disposed on the third gate layer GTL3.

The fourth interlayer insulating layer ILD4 may insulate the third gate layer GTL3 and the first source metal layer SDL1 from each other.

The first source metal layer SDL1 may be disposed on the fourth interlayer insulating layer ILD4. The first source metal layer SDL1 may include the clock line CKL, the connection electrode CE, and a second capacitor electrode CPE2. The clock line CKL may be disposed in the non-display area NDA and extend in the Y-axis direction. The clock line CKL may be disposed adjacent to the display area DA to supply a clock signal to the scan driver 800. The clock line CKL may be disposed closest to the first gate driver 811 in the scan driver 800. The clock line CKL may not overlap the light emitting area EA. The connection electrode CE may electrically connect the second scan connection electrode SCE2 and the first electrode DE of the transistor TR. The second capacitor electrode CPE2 may overlap the gate electrode GE of the transistor TR to form a second capacitor of the pixel SP.

The first via layer VIA1 may be disposed on the first source metal layer SDL1. The first via layer VIA1 may insulate the first source metal layer SDL1 and the second source metal layer SDL2 from each other.

The second source metal layer SDL2 may be disposed on the first via layer VIA1. The second source metal layer SDL2 may include an anode connection electrode ANE and a first low potential line VSL1. The anode connection electrode ANE may electrically connect a pixel electrode AE and the transistor TR. The first low potential line VSL1 may supply a low potential voltage to a second low potential line VSL2.

The second via layer VIA2 may be disposed on the second source metal layer SDL2. The second via layer VIA2 may insulate the second source metal layer SDL2 and the pixel electrode layer PXL from each other.

The pixel electrode layer PXL may be disposed on the second via layer VIA2. The pixel electrode layer PXL may include the pixel electrode AE and the second low potential line VSL2. The pixel electrode AE may be exposed through the light emitting area EA. The pixel electrode AE may be the first electrode of the light emitting element ED of FIG. 3. The second low potential line VSL2 may supply a low potential voltage to the second electrode of the light emitting element ED.

The pixel defining film PDL may be disposed on the second via layer VIA2. The pixel defining film PDL may define a plurality of light emitting areas EA. The pixel defining film PDL may include an organic insulating material such as polyimide (PI).

A dam DAM may be disposed on the fourth interlayer insulating layer ILD4 in the non-display area NDA. The dam DAM may surround the first and second via layers VIA1 and VIA2 and the pixel defining film PDL. The clock line CKL may be surrounded by the dam DAM.

The current disclosure should not be construed as being limited to the embodiments set forth herein. Rather, these embodiments are provided so that this disclosure will be thorough and complete and will fully convey the concept of the present disclosure to those skilled in the art.

While the current disclosure has been particularly shown and described with reference to some embodiments thereof, it will be understood by one of ordinary skill in the art that various changes in form and detail may be made therein without departing from the spirit and scope of the current disclosure as defined by the following claims.

What is claimed is:

1. A display device comprising:

a display area including a pixel that emits light, and a scan driver that is configured to supply a scan signal to the pixel; and a non-display area surrounding the display area, extending in a first direction, and including a clock line that is configured to supply a clock signal to the scan driver, wherein the scan driver includes:

a first gate driver configured to supply a first gate signal to the pixel;

a second gate driver configured to supply a second gate signal and a third gate signal to the pixel; and a light emitting control driver configured to supply a light emitting signal to the pixel, and the clock line is closest to the first gate driver in the scan driver among the first gate driver, the second gate driver, and the light emitting control driver;

a connection line extending in a second direction intersecting the first direction and electrically connecting the clock line and the scan driver, wherein the clock line includes:

a write clock line configured to supply a clock signal to the first gate driver;

a control clock line configured to supply a clock signal to the second gate driver; and a light emitting clock line configured to supply a clock signal to the light emitting control driver.

2. The display device of claim 1, wherein a length of each of the first gate driver, the second gate driver, and the light emitting control driver in a second direction intersecting the first direction is greater than a length of each of the first gate driver, the second gate driver, and the light emitting control driver in the first direction.

3. The display device of claim 1, wherein each of a width of the second gate driver in the first direction and a width of the light emitting control driver in the first direction is greater than a width of the first gate driver in the first direction.

4. The display device of claim 1, wherein the write clock line is closest to the display area among the write clock line, the control clock line, and the light emitting clock line.

5. The display device of claim 1, wherein the connection line includes:
a first connection line electrically connecting the write clock line and the first gate driver;
a second connection line electrically connecting the control clock line and the second gate driver; and
a third connection line electrically connecting the light emitting clock line and the light emitting control driver.

6. The display device of claim 5, wherein the first gate driver includes a plurality of stages arranged in the first direction, and
the second connection line passes between stages adjacent to each other in the first direction.

7. The display device of claim 6, wherein the second gate driver includes a plurality of stages arranged in the first direction, and
the third connection line passes between the stages of the first gate driver adjacent to each other in the first direction and between stages of the second drivers adjacent to each other in the first direction.

8. The display device of claim 1, further comprising:
a start connection line disposed in the non-display area to supply a start signal; and
a start line disposed in the display area and connected to the start connection line to supply the start signal to the scan driver.

9. The display device of claim 1, wherein the scan driver includes a scan transistor disposed in a first active layer including a first material, and
the pixel includes a transistor disposed in a second active layer including a second material different from the first material.

10. The display device of claim 9, wherein the pixel includes:
a light emitting element;
a first transistor supplying a driving current to the light emitting element;
a second transistor supplying a data voltage to a first electrode of the first transistor;
a third transistor electrically connecting a second electrode of the first transistor and a gate electrode of the first transistor;
a fourth transistor configured to supply an initialization voltage to the gate electrode of the first transistor;
a fifth transistor configured to supply a driving voltage to the first electrode of the first transistor; and
a sixth transistor electrically connecting the second electrode of the first transistor and a first electrode of the light emitting element.

11. The display device of claim 10, wherein the first gate driver is configured to supply the first gate signal to a gate electrode of the second transistor,
the second gate driver is configured to supply the second gate signal to a gate electrode of the third transistor and the third gate signal to a gate electrode of the fourth transistor, and
the light emitting control driver is configured to supply the light emitting signal to a gate electrode of each of the fifth and sixth transistors.

12. A display device comprising:
a display area including a pixel that emits light, and a scan driver that is configured to supply a scan signal to the pixel; and
a non-display area surrounding the display area, extending in a first direction, and including a clock line that is configured to supply a clock signal to the scan driver,
wherein the scan driver includes:
a first gate driver configured to supply a first gate signal to the pixel;
a second gate driver configured to supply a second gate signal and a third gate signal to the pixel; and
a light emitting control driver configured to supply a light emitting signal to the pixel, and
the clock line is closest to the first gate driver in the scan driver among the first gate driver, the second gate driver, and the light emitting control driver;
a start connection line disposed in the non-display area to supply a start signal; and
a start line disposed in the display area and connected to the start connection line to supply the start signal to the scan driver, wherein the start line includes:
a first start line configured to supply a first start signal to the first gate driver;
a second start line configured to supply a second start signal to the second gate driver; and
a third start line configured to supply a third start signal to the light emitting control driver, and
the start connection line includes:
a first start connection line configured to supply the first start signal to the first start line;
a second start connection line configured to supply the second start signal to the second start line; and
a third start connection line configured to supply the third start signal to the third start line.

13. The display device of claim 12, wherein each of the first, second, and third start connection lines includes:
a first portion disposed on a first side of the non-display area including the clock line and extending in the first direction;
a second portion connected to the first portion and extending in a second direction intersecting the first direction from a second side adjacent to the first side of the non-display area; and
a third portion connected to the second portion and extending to the display area.

14. An electronic device comprising:
a display device for providing an image, and
wherein the display device comprises:
a display area including a pixel that includes a transistor to emit light, and a scan driver that includes a scan transistor to supply a scan signal to the pixel;
a non-display area surrounding the display area, extending in a first direction, and including a clock line that supplies a clock signal to the scan driver;
a first active layer including a semiconductor area of the scan transistor;
a first gate layer disposed on the first active layer and including a gate electrode of the scan transistor;
a second gate layer disposed on the first gate layer;
a first connection metal layer disposed on the second gate layer and including a gate low voltage line;
a second connection metal layer disposed on the first connection metal layer and including a metal layer;
a second active layer disposed on the second connection metal layer and including a semiconductor area of the transistor overlapping the metal layer;
a third gate layer disposed on the second active layer and including a gate electrode of the transistor; and
a first source metal layer disposed on the third gate layer and including the clock line.

15. The electronic device of claim 14, wherein the scan transistor and the transistor overlap in a thickness direction.

16. The electronic device of claim 14, further comprising a connection line disposed in the first connection metal layer and electrically connecting the clock line and the scan transistor.

17. The electronic device of claim 14, wherein the second gate layer includes a scan capacitor electrode that overlaps the gate electrode of the scan transistor to form a scan capacitor of the scan driver, the first connection metal layer includes a first capacitor electrode that overlaps the metal layer to form a first capacitor of the pixel, and the first source metal layer includes a second capacitor electrode that overlaps the gate electrode of the transistor to form a second capacitor of the pixel.

18. The electronic device of claim 14, wherein the display device is part of one of a television, a laptop computer, a monitor, a billboard, an Internet of Things, a mobile phone, a smartphone, a tablet personal computer, a smartwatch, a watch phone, a mobile communication terminal, an electronic organizer, an electronic book, a portable multimedia player, a navigation device, and an ultra mobile PC.

* * * * *